INVENTOR.
ALFRED J. MILLER
BY Leo A. Plum, Jr.
ATTORNEY

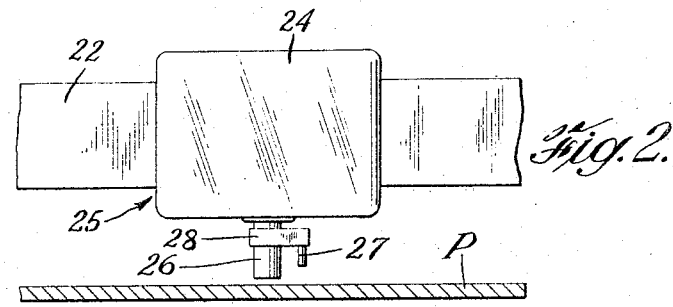
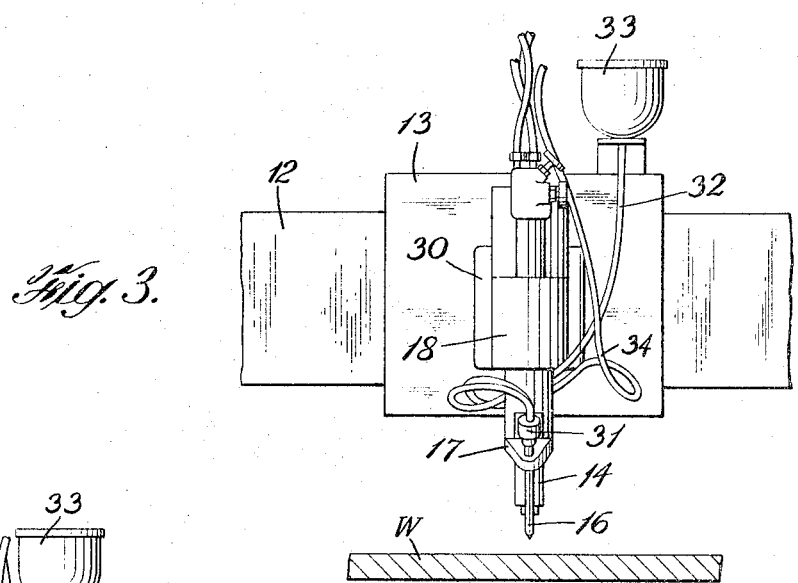
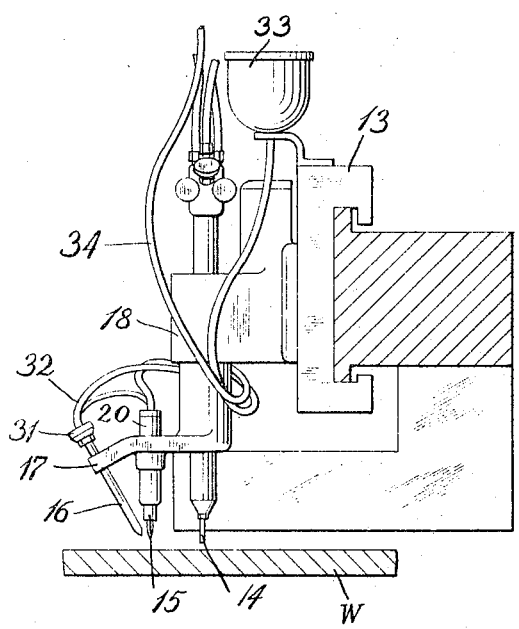

April 4, 1967 A. J. MILLER 3,312,562
METHOD AND APPARATUS FOR CUTTING AND MARKING METAL PLATE
Filed April 30, 1963 8 Sheets-Sheet 3

INVENTOR.
ALFRED J. MILLER
BY
Leo A. Plum, Jr.
ATTORNEY

INVENTOR.
ALFRED J. MILLER
BY Leo A. Plum, Jr.
ATTORNEY

April 4, 1967  A. J. MILLER  3,312,562
METHOD AND APPARATUS FOR CUTTING AND MARKING METAL PLATE
Filed April 30, 1963  8 Sheets-Sheet 5
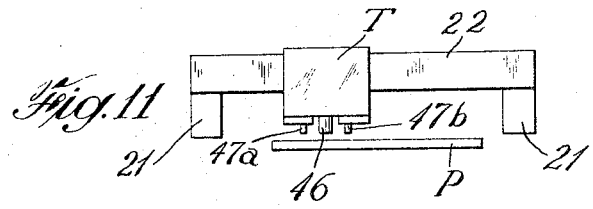
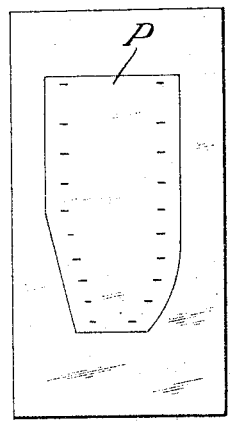
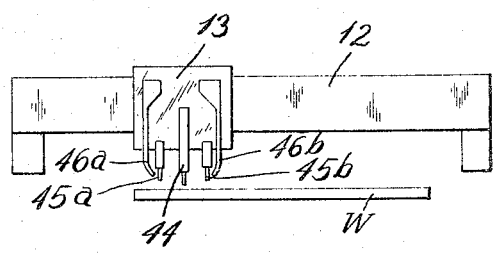
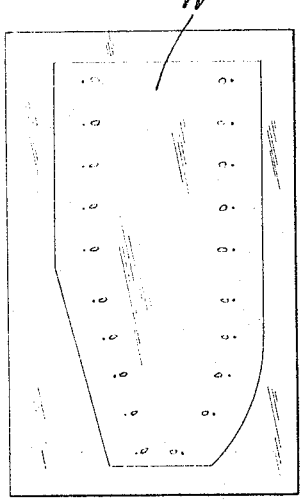
INVENTOR.
ALFRED J. MILLER
BY Leo A. Plum, Jr.
ATTORNEY

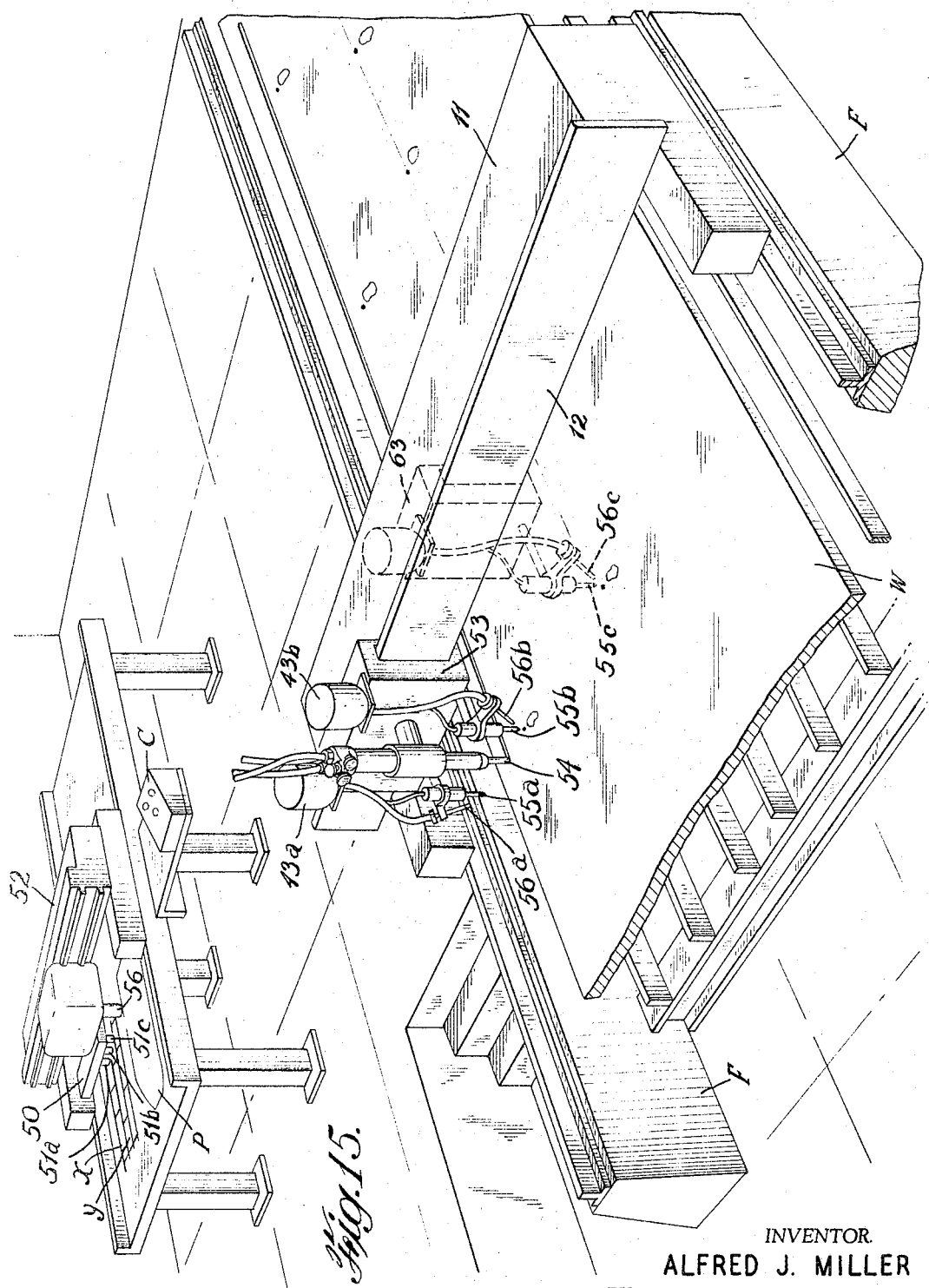

April 4, 1967  A. J. MILLER  3,312,562
METHOD AND APPARATUS FOR CUTTING AND MARKING METAL PLATE
Filed April 30, 1963  8 Sheets-Sheet 7

INVENTOR.
ALFRED J. MILLER
BY Leo A. Plum, Jr.
ATTORNEY

April 4, 1967                 A. J. MILLER                 3,312,562

METHOD AND APPARATUS FOR CUTTING AND MARKING METAL PLATE

Filed April 30, 1963                               8 Sheets-Sheet 8

INVENTOR.
ALFRED J. MILLER
BY Leo A. Plum, jr.
ATTORNEY

United States Patent Office 3,312,562
Patented Apr. 4, 1967

3,312,562
METHOD AND APPARATUS FOR CUTTING AND MARKING METAL PLATE
Alfred J. Miller, Westfield, N.J., assignor to Union Carbide Corporation, a corporation of New York
Filed Apr. 30, 1963, Ser. No. 276,831
8 Claims. (Cl. 117—4)

This invention relates to the cutting of metal plate and, more particularly, to a method and apparatus for marking the plate simultaneously with the cutting thereof, in accordance with an outline on a drawing or template. My invention is particularly well suited for use in the shipbuilding industry.

In most shipyards many of the plates and sections must be marked accurately before or after they are given their final form by flame cutting. The marks are made upon the plate to indicate, for example, the location of brackets, stiffeners, bulkheads, etc.

The plates are generally marked in accordance with either of three basic methods. One method has been to merely lay out the location of the required marks by physical measurement on the plate, followed by the production of indentation marks by hammer and center punch, or by other manual scribing means such as a crayon mark or paint spot. A second method has been to use a full scale template, which is laid out on the plate and the desired locating marks made by hammer and center punch or other suitable means. The third method is known in the art as optical marking. In optical marking, a negative is made of a drawing showing the line of cut to be made as well as the position of any desired locating marks. The negative is inserted into a projector positioned high above the plate to be marked, which is situated in a semi-dark room; the image of the negative outline is then focused upon the plate. Men with hammer and center punch or other suitable means, then move about on the plate and mark the line of cut as well as place the various locating marks on the plate.

In all three of the above methods, the plate is then separately cut, usually by the use of a hand-guided flame cutting machine. Since the plate shops within most shipyards are divided into separate areas for the marking and cutting operations, the overall process requires the plate to be transferred from the marking area to the cutting area. The transportation of the plate from the marking area to the cutting area is cumbersome as the plates may be as much as 50 feet long by 12 feet or more in width and thus necessitate the use of additional crane or special conveyor table capacity. Moreover, it is often necessary to transport the plate to a storage area intermediate the marking and cutting areas since the marking and cutting operations are not always coordinated. It can thus be appreciated that the present-day systems for marking and cutting consume more than double the working space required for the marking operation alone. The further necessity with these systems of requiring the marks to be made manually is a definite drawback.

The marking operation not only consumes many man-hours to accomplish, but also considerably slows down production and promotes errors.

The object of my invention is to provide a method and apparatus for simultaneously and automatically marking plate as it is being cut to a desired shape, in accordance with an outline on a pattern or template.

In accordance with this object, a method is provided for marking points on a shaped plate simultaneous with the cutting of the shape thereof, which comprises progressing a cutting torch along the contour of the shape to be cut in response to a pattern outline tracing photocell, progressing a marking tool spaced from said cutting torch and simultaneously therewith over said plate, and actuating said marking tool in response to a point responsive photocell spaced from said outline tracing photocell and moving simultaneously therewith over points on said pattern offset from the outline thereof, to mark said points on said shaped plate as the plate is being cut by said cutting torch.

Apparatus is provided comprising in a photocell tracer operated torch cutting machine, having a photocell carriage, an outline tracing photocell scanner mounted on said carriage; and a torch carriage controlled by said line tracing photocell scanner, a point responsive photocell on said line tracing photocell scanner, a point responsive photocell on said photocell carriage spaced from said line responsive photocell, and a marker on said torch carriage spaced from the torch and responsive to said point responsive photocell.

In the drawings:

FIG. 2 is a diagrammatic front elevational view of the photocell tracing apparatus shown in FIG. 1;

FIG. 3 is a diagrammatic front elevational view of a portion of the shape cutting machine shown in FIG. 1;

FIG. 4 is a diagrammatic end elevational view of the apparatus shown in FIG. 3;

FIG. 11 is a schematic front elevational view of the tracing apparatus of FIG. 9, shown positioned above a template containing the outline of the shape to be cut and the indications of the marks to be made upon the plate, according to the second embodiment of my invention;

FIG. 12 is a plan view of the template shown in FIG. 11;

FIG. 13 is a schematic front elevational view of an alternative cutting and marking apparatus positioned above a metal plate, to be used according to the second embodiment of my invention;

FIG. 14 is a plan view of the metal plate shown in FIG. 13 illustrating the line of cut and the points of marking thereon;

FIG. 15 is an isometric view of a shape cutting machine with associated photocell tracing apparatus for simultaneously cutting and marking metal plate according to a third embodiment of my invention;

My invention will be illustrated and described in connection with three basic embodiments. FIGS. 1–8 refer to the first embodiment; FIGS. 9–14 relate to the second embodiment; and FIGS. 15–21 relate to the third embodiment.

Figure 1:
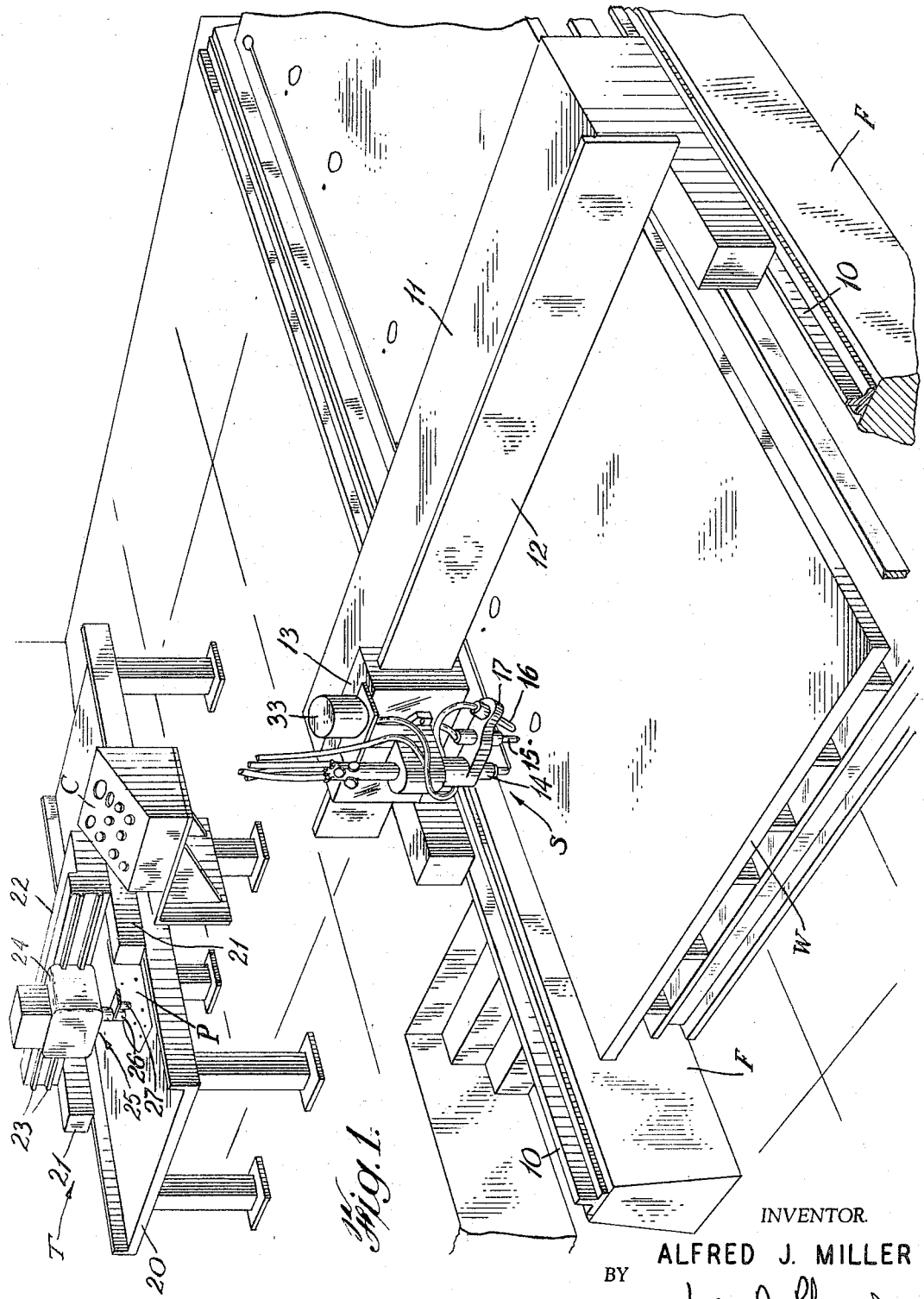
FIG. 1 is an isometric view of a shape cutting machine with associated photocell tracing apparatus for simultaneously cutting and marking metal plate according to one embodiment of my invention.

Referring to FIG. 1, a shape cutting machine S is shown in operative position with respect to a workpiece W such as a metal plate. Photocell tracing apparatus T is provided for guiding the movement of the cutting machine S in accordance with an outline on a pattern P. The tracing system may be mechanically connected to guide the cutting machine as shown, for example, in FIG. 20 of U.S. Patent No. 3,037,888 to Lobosco et al., or may be entirely electrically connected as describe in U.S. Patent No. 2,494,664 to Lobosco. The template or pattern P may be full scale with respect to the shape to be cut or may be of a reduced scale or of an enlarged scale.

The cutting machine consists of foundation supports F upon which longitudinal tracks 10 are mounted. A main carriage 11 rides upon the tracks 10 for longitudinal movement over the workpiece. Transverse track 12 is suitably joined to the main carriage 11 for longitudinal movement therewith. Transverse carriage 13 is ridably mounted upon transverse track 12 for movement in a transverse direction over the workpiece.

The tracing apparatus consists of a table 20 upon which is mounted longitudinal tracks 21. Ridably mounted upon tracks 21 is the tracer main carriage 22. Transverse tracks 23 are suitably joined to main carriage 22 for movement therewith in a longitudinal direction. Transverse carriage 24 is ridably mounted for movement in a transverse direction on the tracks 23. A photocell tracer 25 having an optical scanner 26 is supported within the transverse carriage 24.

The transverse carriage 13 of the cutting machine has mounted thereon a cutting tool 14. Basically, in operation according to any one of the prior art systems referred to above, as the scanner 26 and tracer 25 follows the outline on the template or pattern P, the main carriage 11 and the transverse carraige 13 are caused to move so that the cutting torch moves correspondingly over the metal workpiece W. Basic control of the tracer such as, for example, on-off power, speed, non-automatic operation, etc., can be effected from the control panel C.

According to the first embodiment of my invention, I indicate the marks desired on the workpiece W by putting a dark line or dot mark directly on the pattern, offset in one direction or another from the pattern line of cut. For simplicity of equipment design, I prefer to place all the marks on the pattern at a fixed distance normal to the pattern line of cut.

Assume that it is desired to indicate the marks outside of the pattern outline as shown in FIG. 1. In such case, the tracing system according to this embodiment of my invention will be substantially as shown in FIG. 2. It would consist of a rotatable optical tracing scanner 26 for following the line of cut on the template or pattern P. A second optical scanner 27 is supported in fixed relation with respect to scanner 26 by means of rotatable mounting bracket 28. In such arrangement, the scanner 27 will move in unison with the scanner 26. Whenever the scanner 27 moves over a mark on the template, as shown in FIG. 1, as the scanner 26 follows the pattern outline to be cut, the photocell unit within scanner 27 produces an electrical signal which will be used to actuate a suitable marking device positioned over the workpiece.

Referring now to FIGS. 3 and 4, the transverse carriage 13 of the cutting machine has a cutting torch 14 attached thereto by means of mounting bracket 18. The torch, in this embodiment, is rotatably and controllably driven by a motor and suitable gearing within housing 30. In this embodiment the torch is to rotate in synchronized relation with the rotation of optical scanner 26. Associated with the torch 14 is a marking tool 15. The marking tool is held in fixed rotatable relation to the torch 14 by means of rotating support bracket 17. Also carried by bracket 17 is a paint nozzle 16, which is positioned close to the marking tool. Although not mandatory, I prefer to utilize a solenoid operated center punch as the marking tool. The solenoid 20 is electrically connected by wires 34 to the photocell scanner 27. Similarly, paint nozzle 16 may have a solenoid operated valve 31 in the paint supply line 32 leading from paint reservoir 33, electrically connected by means of wires 34, to the photocell scanner 27.

Figure 5:
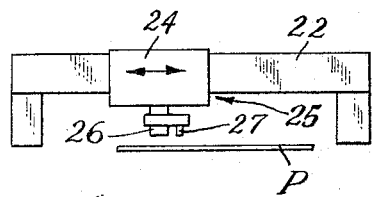
FIG. 5 is a schematic elevational view of the tracer shown in FIG. 2, positioned over a template containing the outline of the shape to be cut and the indications of the marks to be made on the plate.
Figure 6:
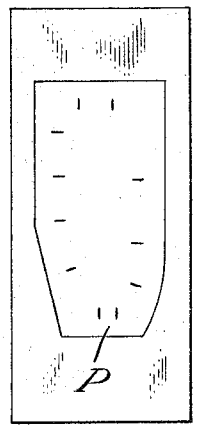
FIG. 6 is a schematic plan view of the template shown in FIG. 5.

In operation, whenever the scanner 27 moves over a mark on the template, an electric signal is produced which, through amplification, energizes the solenoids on the cutting machine whereby the center punch 15 produces an indentation on the metal workpiece while the paint nozzle 16 discharges a spurt of paint adjacent the indentation. The purpose of the paint mark is to make it easier to find the marks made by the center punch on the plate. The marking of the plate as just described takes place simultaneously with the cutting of the plate by torch 14. This operation can be more easily understood by referring to FIGS. 5 through 8. As shown in FIGS. 5 and 6 the pattern or template P has the outline of the desired shape to be cut from the metal workpiece W. At a fixed distance on the pattern from the line of cut, short dash-type lines are placed at locations with respect to said line of cut, so as to correspond to the locations where marks are desired on the workpiece W. In operation, as the scanner 26 follows the line of cut over the pattern, the scanner 27 moves in unison with it but at a fixed radial distance from it, over the pattern. Since scanner 26 is of the rotating type, it is designed to rotate in a direction such that the scanner 27 will always follow a path over the dash lines on the pattern. For example, for tracing as illustrated in FIGS. 5 and 6, the scanners 26 and 27 will rotate in a counterclockwise direction when the tracer moves around the line of cut on the pattern. In this manner, the scanner 27 will always travel in a path where the marking indicators will be spotted by it.

Figure 7:
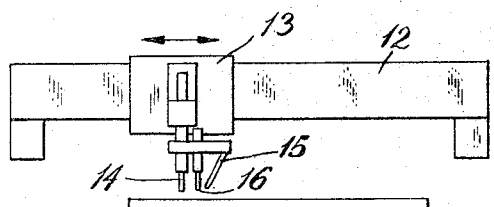
FIG. 7 is a schematic front elevational view of the cutting machine showing the cutting and marking apparatus positioned above the metal plate.
Figure 8:
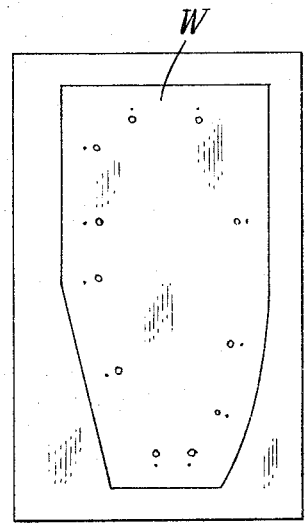
FIG. 8 is a plan view of the metal plate shown in FIG. 7 illustrating the line of cut and the points of marking thereon.

Since the scanner 26 and the cutting torch 14 are operatively synchronized with one another, the torch 14 will cut along a path on the workpiece W corresponding to the pattern outline followed by the scanner 26. Whenever the scanner 27 moves over a marking actuator spot or strip on the pattern it instantaneously produces an electrical signal which is transmitted to energize the marking tool 15. In this case, I prefer to use the signal generated to energize the solenoid operated center punch 16 whereby an indentation or mark will be made upon the workpiece at the exact location desired. In order to facilitate the subsequent recognition of the marks made, I prefer to also use the electrical signal generated by the scanning unit 27 to energize a solenoid valve in a paint supply line whereby the paint nozzle 17 will discharge a spurt of paint adjacent the center-punched mark. In order to operate with only one marking tool on the transverse carriage 13, as in the illustration and description of the scanning units, I employ a rotatable torch and marking tool. As shown in FIGS. 7 and 8, the torch 14, marking tool 15, and paint nozzle 16, rotate in a counter-clockwise direction. In this manner, the marking tool 15 and paint nozzle 16 always travel over a path in which the marks are desired.

Figure 9:
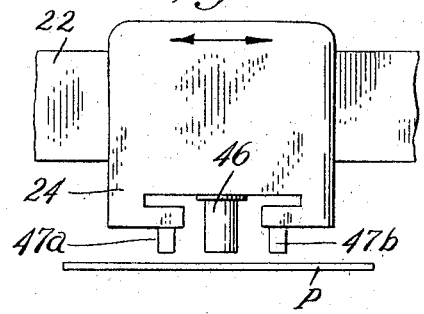
FIG. 9 is a diagrammatic elevational view of an alternative tracing apparatus to be used according to a second embodiment of my invention.
Figure 10:
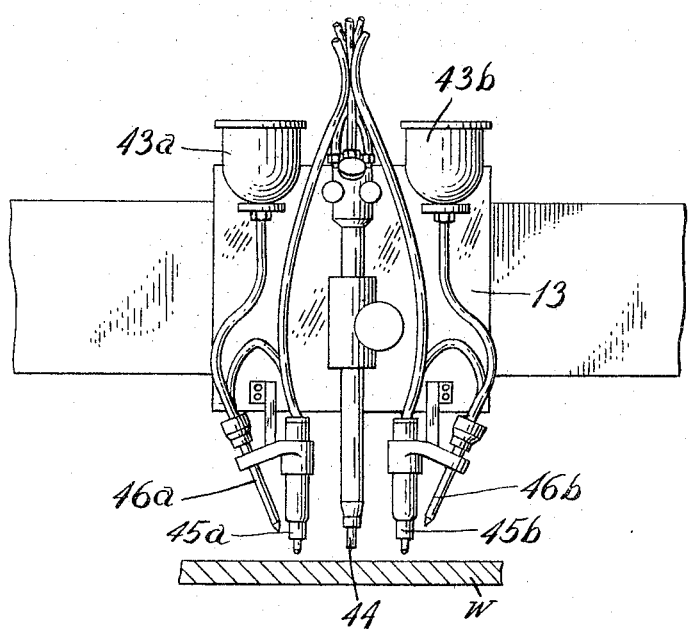
FIG. 10 is a diagrammatic front elevational view of an alternative cutting and marking apparatus positioned above a metal plate, according to the second embodiment of my invention.

Referring to FIGS. 9–14, the second embodiment of my invention illustrates a system for simultaneously marking and cutting a workpiece without the need for a rotating scanning unit for spotting the marks. Another feature of this embodiment is that the marking tool is not required to rotate with the cutting torch, which in some cases will allow a simpler, more rugged construction, and thus reduce vibration on the cutting torch support. As shown in FIG. 9, a photocell tracing unit having an outline following scanner 46 and fixed scanning units 47a and 47b is employed. Instead of employing one rotatable scanning unit for picking up the marking indications on the pattern, two scanning units are used, each one being rigidly attached to the tracer frame. Correspondingly, as shown in FIG. 10, the transverse carriage 13 according to this embodiment has two marking tools 45a and 45b rigidly mounted upon it as well as two paint nozzles 46a and 46b. As illustrated, the marking tools 45a and 45b and paint nozzles 46a and 46b are not physically connected to the cutting torch 44 although their operation is dependent upon movement of the torch since the torch is guided by the main tracing scanner 46. Although separate paint reservoirs 43a and 43b are shown, one reservoir properly connected with separate valving may, of course, be used to supply both paint nozzles.

According to this embodiment, the main scanning unit 46 is electrically or mechanically connected to guide the movement of torch 44 which is rigidly counted on transverse carriage 13 of the cutting machine. Fixed scanner 47a is electrically connected to energize the respective solenoids which activate marking tool 45a and paint nozzle 46a. Similarly, fixed scanner 47b is electrically connected to energize the respective solenoids which activate marking tool 45b and paint nozzle 46b.

Referring now to FIGS. 11 to 14, in operation, as the scanning unit 46 moves along the path indicated, the tracing unit does not rotate. For the operation indicated, as the tracer T moves in a southerly direction over the template, scanning unit 47b is in operation. As this unit moves over an actuating line or spot on the pattern which is a marking indication, its light sensitive photocell generates a signal which energizes the respective solenoids controlling the operation of the marking tool 45b and the paint nozzle 46b so that a mark is placed on the plate at the location corresponding to the mark indication on the pattern. Simultaneously, the torch 44 is cutting the plate according to the pattern outline. As the tracer T moves in a northerly direction scanning unit 47a is in operation. Similarly, marking tool 45a and paint nozzle 46a will be in operative position over the workpiece as the cutting machine carriage 13 is moving in a northerly direction. Therefore as the mark indicators are spotted by scanning unit 47a, it generates an electrical signal which energizes the respective solenoids controlling the actuation of marking tool 45a and paint nozzle 46a. The present system is not designed for marking the plate as it is being simultaneously cut in a transverse (east-west) direction, as such transverse marks are not always necessary.

Figure 19:
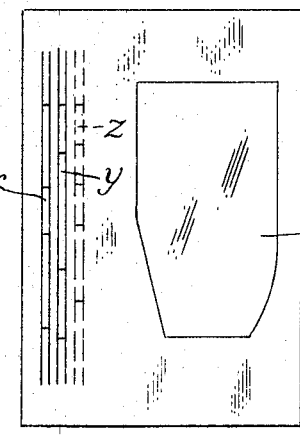
FIG. 19 is a schematic plan view of the template shown in FIG. 18.

The third embodiment of my invention I have termed channel marking. As shown in FIGS. 15 and 19, alongside the outline of the shape to be cut according to the pattern there are two channels drawn, designated as x and y. Fastened to the longitudinal carriage 52 for movement therewith is a mounting plate assembly 50. Two scanning units are fastened to the mounting plate assembly, each scanner operating within one of the respective channels. As in the first embodiment the main scanner 56 has its movement synchronized with the movement of the cutting torch 54. Offset to each side of the torch 44 are marking tools 55a and 55b, respectively. Similarly offset from this torch are paint nozzles 56a and 56b, respectively. Since the marking tools, paint nozzles and cutting torch are all fastened to the transverse carriage 53 of the cutting machine, the location of the marking tools and paint nozzles is related to the location of the cutting torch 54, which in turn is controlled in synchronized relation by the scanning unit 56.

Figure 16:
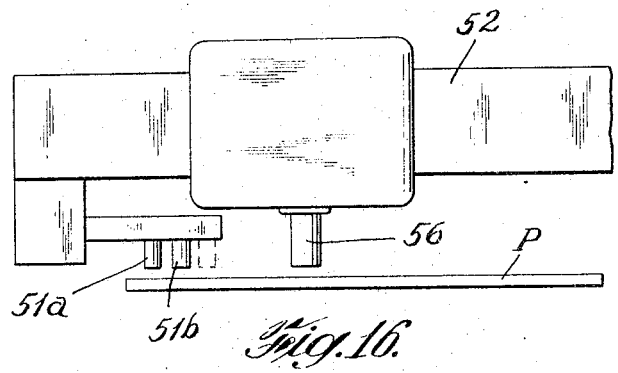
FIG. 16 is a diagrammatic elevational view of still another tracing apparatus to be used according to a third embodiment of my invention.
Figure 17:
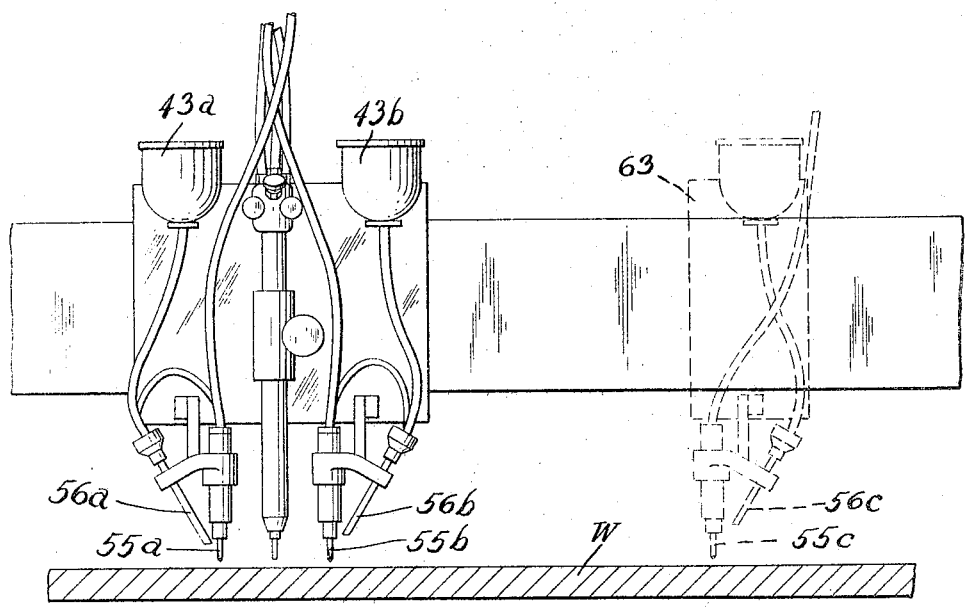
FIG. 17 is a diagrammatic front elevational view of the cutting and marking apparatus to be used according to the third embodiment of my invention, positioned above a metal plate.

Referring more particularly to FIGS. 16 and 17, fixed scanner 51a is electrically connected to operate the respective solenoids actuating the marking tool 55a and paint nozzle 56a. Similarly, fixed scanner unit 51b is electrically connected to operate the respective solenoids actuating the marking tool 55b and paint nozzle 56b.

Referring now to FIGS. 18–21, the drawing or pattern P has channels x and y offset from the outline of the shape to be cut. Each channel is referenced to one of the longitudinal sides of the outline of the shape to be cut. For purposes of illustration, channel x may be referenced to locate the longitudinal position of marks to be made at an offset from longitudinal side y' on the workpiece. In operation, as the tracer T moves in a longitudinal direction along the outline on the pattern, the bank of fixed scanners, 51a and 51b, move respectively over channel x and channel y. By a suitable automatic switching arrangement (not shown) scanner 51a is made operative only when the tracer is moving in one longitudinal direction while scanner 51b is made operative only when the tracer movement is in the opposite longitudinal direction. For the movements illustrated in FIGS. 18–21, scanner 51a would be operative when the tracer movement is south, while scanner 51b is made operative only when the tracer movement is north. Since scanner 51a is electrically connected to actuate marking tool 55b and paint nozzle 56b whenever the tracer is moving southerly along the outline, scanner 51a will energize marking tool 55b and paint nozzle 56b as the scanner passes over the marking indicator spots or lines within channel x. This will cause a mark to be made at the desired longitudinal location of the marking indication in channel x with respect to the pattern outline. Similarly, when the tracer is moving northerly along the outline (as opposed to southerly), scanner 51b will spot the marking indicators within channel y and will energize marking tool 55a and paint nozzle 56a to mark the plate at the corresponding and desired longitudinal location on the workpiece. Since the tracer T, as the tracing scanner 56 follows the pattern outline, guides the cutting torch 54 to cut a corresponding kerf along the workpiece, the marking tools and paint nozzles moving with the torch, enable the plate to be marked simultaneously as it is being cut.

Figure 18:
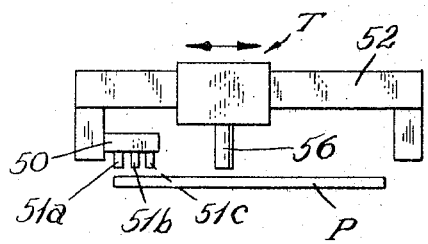
FIG. 18 is a schematic elevational view of the tracing apparatus shown in FIG. 16, positioned over a template containing the outline of the shape to be cut and the indications of the marks to be made on the plate, according to the third embodiment of my invention.
Figure 20:
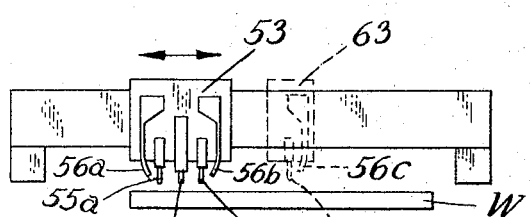
FIG. 20 is a schematic front elevational view of the cutting and marking apparatus shown in FIG. 17, positioned over the metal plate.
Figure 21:
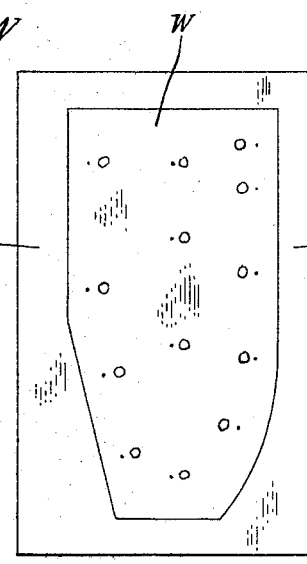
FIG. 21 is a plan view of the metal plate shown in FIG. 20, illustrating the line of cut and the points of marking thereon.

If it is desired to additionally mark the plate along a longitudinal path intermediate the side paths as, for example, along the center-line of the workpiece, it may be accomplished by adding a carriage 63, as shown in FIGS. 15 and 20, to the transverse track of the cutting machine. This carriage would be fixed in position while carriage 53 is proceeding in a basically south direction. When carriage 53 moves in an easterly direction it would shift carriage 63 towards the edge of the transverse track. This would enable carriage 53 to move in a northerly direction for cutting and marking. As shown in FIGS. 15, 18 and 19, marking channel z has been added for indicating therein the longitudinal locations of desired marks along the centerline of the workpiece. To spot the marking indications in channel z, a fixed scanner 51c should be added to the mounting plate assembly 50. Scanner 51c should be made operative only when carriage 63 is in operative position with respect to the workpiece. Scanner 51c should be electrically connected to energize the respective solenoids associated with the marking tool 55c and the paint supply line feeding paint nozzle 56c. As shown in FIGS. 18–22, as scanner 51c moves longitudinally south over channel z, carriage 63 is moving longitudinally south over the workpiece. As a marking indication is spotted by scanner 51c, it generates an electrical signal which energizes the solenoid operating marking tool 55c and a mark is placed in the corresponding position along the centerline of the workpiece. Simultaneously, the signal generated energizes a solenoid operated valve in the paint supply line feeding paint nozzle 56c, and a spot of paint is discharged adjacent the mark made by marking tool 55c.

Modifications may, of course, be made in the invention without departing from the spirit and purpose of it. For example, the solenoid operated center punch could be used alone without the paint spotter nozzle. Alternatively, the paint spotter nozzle could be used in place of the center punch, as the marking tool. Still further, an apparatus for striking an electric arc between such device and the workpiece could be actuated by the marking photocell in place of the solenoid operated center punch.

What is claimed is:

1. A method for marking points on a shaped plate simultaneous with the cutting of the shape thereof, which comprises progressing a cutting torch along the contour of the shape to be cut in response to a pattern outline tracing photocell moving over the corresponding contour on a pattern, progressing a marking tool spaced from said cutting torch simultaneously with said torch over said plate, and actuating said marking tool in response to a point responsive photocell spaced from said outline tracing photocell and moving simultaneously therewith over points on said pattern offset from the outline thereof, to mark said points on said shaped plate as the plate is being cut by said cutting torch.

2. A method for marking points on a shaped metal plate simultaneous with the cutting of the shape thereof, which comprises progressing a cutting torch along the contour of the shape to be cut in response to a pattern outline tracing photocell moving over the corresponding contour on a pattern, progressing a rotatable marking tool mounted to said cutting torch and at a fixed radial distance therefrom simultaneously over the metal plate, and actuating said marking tool in response to a point responsive photocell mounted at a fixed radial distance from said pattern outline tracing photocell and moving simultaneously therewith over points on said pattern offset a fixed distance normal to the pattern outline, to mark said points on said plate at locations corresponding to the locations of the points on said pattern.

3. A method as claimed in claim 1 wherein the marking tool which is actuated by said point responsive photocell comprises a solenoid operated center punch.

4. A method for marking points on a shaped plate simultaneous with the cutting of the shape thereof, which comprises guiding a cutting torch along the contour of the shape to be cut in response to a pattern outline tracing photocell moving over the corresponding contour on a pattern, guiding a solenoid actuated center punch and a paint nozzle having a solenoid operated valve in its paint supply line simultaneously with said cutting torch over said plate, and actuating the solenoids to energize the center punch and to supply paint to said paint nozzle in response to a point responsive photocell spaced from said outline tracing photocell and moving simultaneously therewith over points on said pattern offset from the outline thereof, to mark said points on said plate and discharge a paint spot adjacent each of said points as the plate is being cut by said cutting torch.

5. Apparatus for marking points on a shaped metal plate simultaneous with the cutting of the shape thereof, which comprises in a photocell tracer operated torch cutting machine having a photocell carriage, an outline tracing photocell scanner mounted on said carriage, and a torch carriage controlled by said outline tracing photocell scanner; a point responsive photocell mounted on said photocell carriage and spaced from said outline tracing photocell, and a marker on said torch carriage spaced from the torch and responsive to said point responsive photocell.

6. Apparatus according to claim 5 in which the marker comprises a center punch operated by a solenoid, said solenoid being electrically actuated by the point responsive photocell.

7. Apparatus for marking points on a shaped metal plate simultaneous with the cutting of the shape thereof, which comprises in a photocell tracer operated torch cutting machine having a photocell carriage, an outline tracing photocell scanner mounted on said carriage, and a torch carriage controlled by said outline tracing photocell scanner; a point responsive photocell mounted on said photocell carriage and spaced from said outline tracing photocell, a marker on said torch carriage spaced from the torch and responsive to said point responsive photocell, and a paint discharge means spaced from the torch for movement therewith, said paint discharge means being responsive to said point responsive photocell.

8. Apparatus for marking points on a shaped metal plate simultaneous with the cutting of the shape thereof, which comprises in a photocell tracer operated torch cutting machine having a photocell carriage, an outline tracing photocell scanner mounted on said carriage and a torch carriage controlled by said outline tracing photocell scanner; a pair of point responsive photocells fixedly mounted on said photocell carriage and spaced from said outline tracing photocell, and a pair of markers on said torch carriage spaced from and on opposite sides of the torch, each of said markers being responsive to a respective point responsive photocell.

References Cited by the Examiner

UNITED STATES PATENTS

| 2,508,468 | 5/1950 | Rathe | 148—9 |
| 3,124,691 | 3/1964 | Brouwer | 250—202 |
| 3,153,109 | 10/1964 | Steventon et al. | 148—9 |
| 3,230,925 | 1/1966 | Blanz | 83—71 X |

ALFRED L. LEAVITT, *Primary Examiner.*

W. L. SOFFIAN, A. GRIMALDI, *Assistant Examiners.*